(12) United States Patent
Yamashita et al.

(10) Patent No.: US 9,287,783 B2
(45) Date of Patent: Mar. 15, 2016

(54) POWER SUPPLY DEVICE

(71) Applicant: FDK CORPORATION, Tokyo (JP)

(72) Inventors: Shigeharu Yamashita, Kawasaki (JP);
Tsunehiro Ohno, Kawasaki (JP);
Kazuomi Watanabe, Kawasaki (JP)

(73) Assignee: FDK CORPORATION, Tokyo (JP)

( * ) Notice: Subject to any disclaimer, the term of this patent is extended or adjusted under 35 U.S.C. 154(b) by 158 days.

(21) Appl. No.: 14/098,938

(22) Filed: Dec. 6, 2013

(65) Prior Publication Data

US 2014/0092640 A1 Apr. 3, 2014

Related U.S. Application Data

(63) Continuation of application No. PCT/JP2011/006244, filed on Nov. 8, 2011.

(51) Int. Cl.
| | | |
|---|---|---|
| *H02M 3/158* | (2006.01) | |
| *H02M 3/335* | (2006.01) | |
| *H02M 1/42* | (2007.01) | |
| *H02M 1/00* | (2007.01) | |

(52) U.S. Cl.
CPC ............ *H02M 3/335* (2013.01); *H02M 1/4225* (2013.01); *H02M 3/33592* (2013.01); *H02M 2001/007* (2013.01); *Y02B 70/126* (2013.01); *Y02B 70/1475* (2013.01)

(58) Field of Classification Search
CPC  H02M 3/584; H02M 7/493; H02M 2001/007
USPC ..................................... 363/65, 89
See application file for complete search history.

(56) References Cited

U.S. PATENT DOCUMENTS

| | | | | |
|---|---|---|---|---|
| 5,404,092 A | * | 4/1995 | Gegner ............... | H02M 1/4208 323/207 |
| 7,092,262 B2 | * | 8/2006 | Ryan .................... | H02M 7/062 323/207 |
| 7,529,110 B1 | * | 5/2009 | Haines .................... | H02M 1/10 363/65 |
| 2009/0027931 A1 | * | 1/2009 | Usui ...................... | H02J 9/061 363/84 |
| 2012/0112657 A1 | * | 5/2012 | Van Der Veen ..... | H02M 1/4225 315/291 |
| 2013/0187567 A1 | * | 7/2013 | Li ...................... | H05B 33/0815 315/297 |
| 2014/0092640 A1 | * | 4/2014 | Yamashita .......... | H02M 1/4225 363/17 |

FOREIGN PATENT DOCUMENTS

| | | |
|---|---|---|
| JP | 2008-148473 | 6/2008 |
| JP | 2008-199731 | 8/2008 |

OTHER PUBLICATIONS

ISR for related PCT/JP2011/006244 mailed on Jan. 17, 2012 and its English translation.
IPRP for related PCT/JP2011/006244 mailed on May 13, 2014 and its English translation.

* cited by examiner

*Primary Examiner* — Jeffrey Sterrett
(74) *Attorney, Agent, or Firm* — Ladas & Parry, LLP

(57) ABSTRACT

A PFC (Power Factor Correction) circuit improves the power factor of rectified power. Upon receiving output of the PFC circuit, a first DC-DC converter generates a voltage to be supplied to a load. Upon receiving output of the PFC circuit, a second DC-DC converter and a third DC-DC converter generate a control voltage. The second DC-DC converter and the third DC-DC converter are cascade-connected. An input terminal of the third DC-DC converter is connected to both an output terminal of the second DC-DC converter and an output terminal of the first DC-DC converter.

7 Claims, 5 Drawing Sheets

POWER SUPPLY DEVICE

CROSS-REFERENCE TO RELATED APPLICATION

This application is a continuation of International Patent Application No. PCT/JP2011/006244filed on Nov. 8, 2011, the disclosure of which is hereby incorporated by reference into the present application in its entirety.

BACKGROUND OF THE INVENTION

1. Field of the Invention

The present invention relates to a power supply device for supplying electrical power to a server and the like.

2. Description of the Related Art

In recent years, the scale of data centers is being expanded with the sophistication of Internet services, the use of cloud computing systems, and the like. The number of database servers and the like that are installed at data, centers is increasing, and there is a strong need for increasing the efficiency of power supply devices that supply electrical power to these servers and the like. A loss in a power supply device is converted into Joule heat, thus causing an increase in temperature.

As power supply devices used for computers, power supply devices in which a switching method is used are widely used. In order to increase the efficiency of a power supply device in which a switching method is used, it is effective to design such that the input voltage range of a switching power supply is set be small. In a power supply device 100 shown in FIG. 1 (details are described later), the input voltage range of a transistor used for a second switch S2 through a fifth switch S5 is designed to be small. The winding ratio of a transformer T1 needs to be designed in accordance with the lower-limit voltage in the input voltage range. Thus, when the input voltage range is narrowed, the winding ratio of the transformer T1 can be designed to be large, and the respective duty ratios of the second switch S2 through the fifth switch S5 can be increased for driving. When the respective duty ratios of the second switch S2 through the fifth switch S5 are increased, a peak voltage is lowered, and a loss due to switching is reduced. The cost can be also reduced when a transistor with a small input voltage range is used.

In order to narrow the range of voltages to be input to a first DC-DC converter 40 in the power supply device 100 shown in FIG. 1, a PFC (Power Factor Correction) circuit 30 is provided in a stage preceding the first DC-DC converter 40. It is necessary to turn a first switch S1 on and off when the PFC circuit 30 is being operated, and consuming drive power therefor is thus consumed. In order to reduce this drive power, the PFC circuit 30 is basically stopped when the first DC-DC converter 40 is stopped.

In a power supply device, a switching power supply for generating a control voltage to be used inside and outside the power supply device is mounted in addition to a switching power supply for generating a voltage to be supplied to a load. In the power supply device 100 shown in FIG. 1, a second DC-DC converter 60 corresponds to this switching power supply. There are cases where the second DC-DC converter 60 is operated even when the first DC-DC converter 40 and the PFC circuit 30 are being stopped. In this case, the range of voltages to be input to the second DC-DC converter 60 is not narrowed by the PFC circuit 30. Therefore, it is necessary to design the input voltage range to be relatively large for the second DC-DC converter 60. Under these circumstances, the inventors of the present invention have found a technique for improving the efficiency of a switching power supply for generating a control voltage.

SUMMARY OF THE INVENTION

In this background, a purpose of the present invention is to provide a technology for increasing the efficiency of a power supply device while suppressing an increase in power consumption.

A power supply device according to one embodiment of the present invention includes: a PFC (Power Factor Correction) circuit configured to improve the power factor of rectified power; a first DC-DC converter configured to generate a voltage to be supplied to a load upon receiving output of the PFC circuit; and a second DC-DC converter and a third DC-DC converter configured to generate a control voltage upon receiving the output of the PFC circuit. The second DC-DC converter and the third DC-DC converter are cascade-connected, and an input terminal of the third DC-DC converter is connected to both an output terminal of the second DC-DC converter and an output terminal of the first DC-DC converter.

According to this embodiment, a voltage can be supplied to the input of the third DC-DC converter both from the second DC-DC converter and from the first DC-DC converter. Thus, a highly-efficient voltage supply method can be selected for the generation of a control voltage, and the control voltage can be generated with high efficiency as a whole.

The power supply device may further include: a control unit configured to control the operation and stopping of the PFC circuit, the first DC-DC converter, the second DC-DC converter, and the third DC-DC converter. The control unit may operate the second DC-DC converter and the third DC-DC converter in the case of generating the control voltage when the PFC circuit and the first DC-DC converter are being stopped. With this, the control voltage can be generated even when the first DC-DC converter is being stopped.

The control unit may operate the third DC-DC converter and stop the second DC-DC converter in the case of generating the control voltage when the PFC circuit and the first DC-DC converter are being operated. With this, the control voltage can be generated with high efficiency.

Rectification elements may be inserted each between the input terminal of the third DC-DC converter and the output terminal of the second DC-DC converter and between the input terminal of the third DC-DC converter and the output terminal of the first DC-DC converter.

The rectification element inserted between the input terminal of the third DC-DC converter and the output terminal of the first DC-DC converter is a MOSFET (Metal Oxide Semiconductor Field Effect Transistor), and the MOSFET may be turned on when the first DC-DC converter is being operated and may be turned off when the first DC-DC converter is being stopped. With this, voltage drops caused due to the use of a diode can be prevented.

An output voltage of the first DC-DC converter may be set to be higher than an output voltage of the second DC-DC converter. A DC-DC converter having a conversion efficiency that is higher than the conversion efficiency of the second DC-DC converter may be used for the first DC-DC converter.

Optional combinations of the aforementioned constituting elements, and implementations of the invention in the form of apparatuses, methods, and systems may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

DETAILED DESCRIPTION OF THE INVENTION

The invention will now be described by reference to the preferred embodiments. This does not intend to limit the scope of the present invention, but to exemplify the invention.

Figure 1:
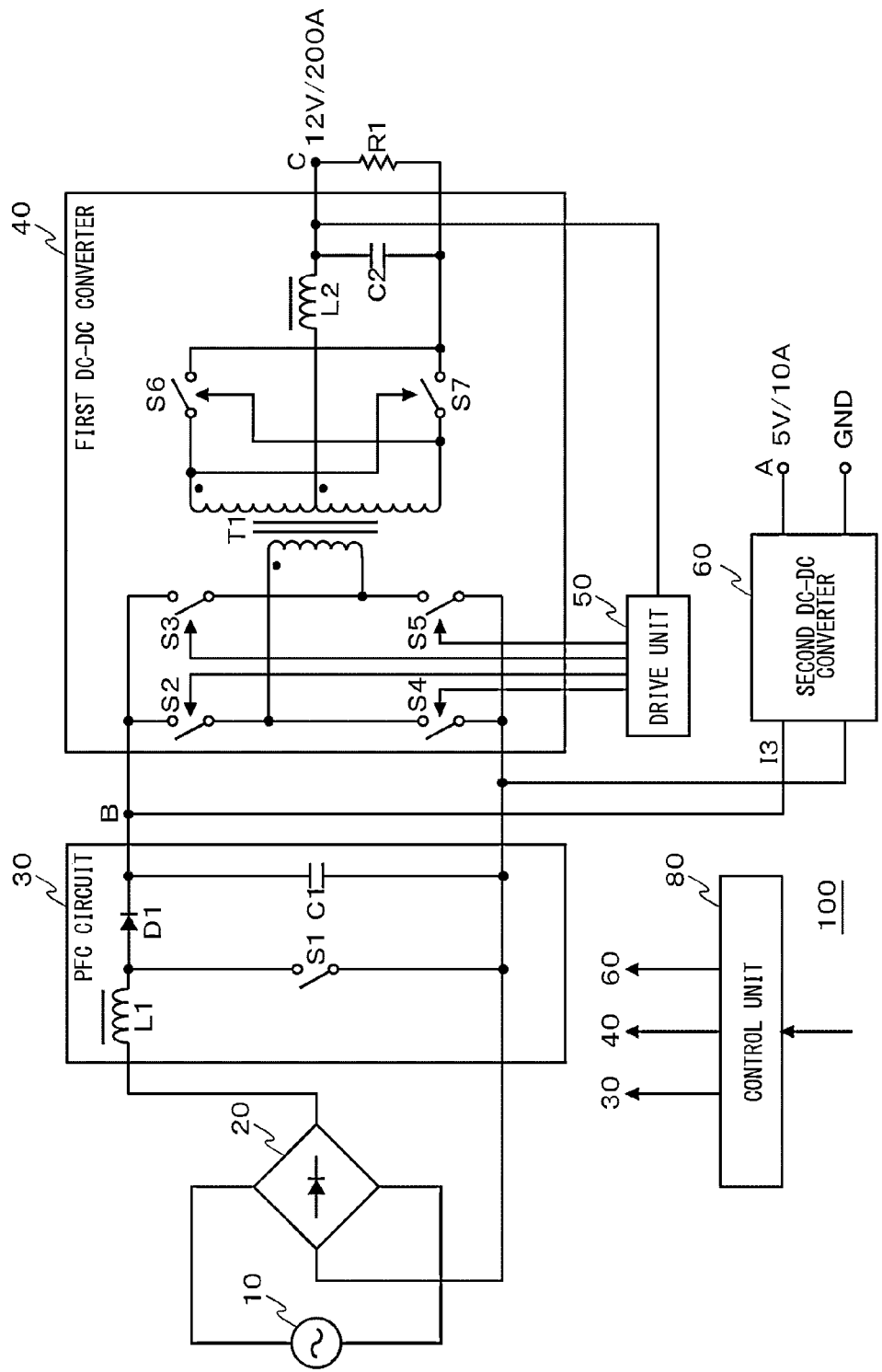
FIG. 1 is a diagram illustrating the configuration of a power supply device according to a comparative example.

FIG. 1 is a diagram illustrating the configuration of a power supply device 100 according to a comparative example. The third power supply device 100 is an AC-DC converter that converts AC (alternating current) power provided from an AC power supply 10 (commercial power supply) into DC (direct current) power and supplies the DC power to a load R1. In the subject specification, it is assumed that an input voltage to the power supply device 100 is AC 80 to AC 264 V, which correspond to the worldwide specification, and that the load R1 is a motherboard equipped with a CPU. An explanation is given in the following based on an example where the power supply device 100 supplies DC 12 V/200 A to the load R1. In other words, this is an example where a power of 2400 W is supplied to the load R1 from the power supply device 100.

The power supply device 100 is provided with a rectification circuit 20, a PFC circuit 30, a first DC-DC converter 40, a drive unit 50, a second DC-DC converter 60, and a control unit 80. The rectification circuit 20 is constituted of a diode bridge circuit and rectifies AC power supplied from the AC power supply 10. Since the input voltage to the rectification circuit 20 is AC 80 to AC 264 V, the output voltage of the rectification circuit 20 is about DC 100 to DC 380V.

The PFC circuit 30 improves the power factor of the power rectified by the rectification circuit 20 and supplies the power to the first DC-DC converter 40 and the second DC-DC converter 60. When the PFC circuit 30 is being stopped, input to the PFC circuit 30 is directly output. The operation and stopping of the PFC circuit 30 is controlled by the control unit 80.

In FIG. 1, the PFC circuit 30 is constituted of a boost-type PFC circuit. The boost-type PFC circuit includes a first inductor L1, a first switch S1, a first diode D1, and a first capacitor C1. An input-side terminal of the first inductor L1 is connected to an output potential of the rectification circuit 20, and an output-side terminal of the first inductor L1 is connected to an anode terminal of the first diode D1. A high potential side terminal of the first switch S1 is connected to a node between the first inductor L1 and the first diode D1, and a low potential side terminal of the first switch S1 is connected to a low potential side reference potential. Hereinafter, a low potential side reference potential represents a ground potential in the subject specification. A high potential side terminal of the first capacitor C1 is connected to a cathode terminal of the first diode D1, and a low potential side terminal of the first capacitor C1 is connected to the ground potential.

The first switch S1 can be formed by a transistor such as a MOSFET (Metal Oxide Semiconductor Field Effect Transistor) or the like. To a control terminal (which is a gate terminal or a base terminal, and the control terminal hereinafter represents a gate terminal on the assumption that a FET is employed) of this transistor, a control signal is input from the control unit 80. The transistor is turned on or off according to the control signal. With this, an electric current flowing through the first inductor L1 is turned on or off, thereby improving a power factor and increasing an input voltage. An output voltage of the PFC circuit 30 is smoothed by the first capacitor C1 and then applied to the first DC-DC converter 40 and the second DC-DC converter 60.

In the subject specification, an input voltage to the PFC circuit 30 is approximately DC 100 to DC 380 V. An output voltage of the PFC circuit 30 is also approximately DC 100 to DC 380 V when the PFC circuit 30 is being stopped. When the PFC circuit 30 is being operated, the PFC circuit 30 increases the input voltage of approximately DC 100 to DC 380 V to DC 380 V and outputs the input voltage as increased.

Upon receiving the output of the PFC circuit 30, the first DC-DC converter 40 generates a voltage to be supplied to the load R1. The first DC-DC converter 40 is an insulation type converter in which a full-bridge method is employed. The first DC-DC converter 40 includes a second switch S2, a third switch S3, a fourth switch S4, a fifth switch S5, a transformer T1, a sixth switch S6, a seventh switch S7, a second inductor L2, and a second capacitor C2.

The second switch S2, the third switch S3, the fourth switch S4, and the fifth switch S5 constitute a full-bridge circuit. The respective high potential side terminals of the second switch S2 and the third switch S3 are connected to an output potential of the PFC circuit 30. The respective low potential side terminals of the fourth switch S4 and the fifth switch S5 are connected to the ground potential. The low potential side terminal of the second switch S2 and the high potential side terminal of the fourth switch S4 are connected to each other, and a node thereof is connected to one terminal of a primary winding of the transformer T1. The low potential side terminal of the third switch S3 and the high potential side terminal of the fifth switch S5 are connected to each other, and a node thereof is connected to the other terminal of the primary winding of the transformer T1.

The second switch S2, the third switch S3, the fourth switch S4, and the fifth switch S5 can be formed by transistors such as MOSFETs or the like. A drive signal from the drive unit 50 is input to a gate terminal of each of the transistors. In a state where the second switch S2 and the fifth switch S5 are controlled to be on and where the third switch S3 and the fourth switch S4 are controlled to be off, a forward current flows through the primary winding of the transformer T1. In a state where the second switch S2 and the fifth switch S5 are controlled to be off and where the third switch S3 and the fourth switch S4 are controlled to be on, a reverse current flows through the primary winding of the transformer T1.

A middle point of a secondary winding of the transformer T1 is connected to an input-side terminal of the second inductor L2. Of both side terminals of the secondary winding, one terminal is connected to an input-side terminal of the sixth switch S6, and the other terminal is connected to an input-side terminal of the seventh switch S7. The respective output-side terminals of the sixth switch S6 and the seventh switch S7 are connected to the ground potential. The output-side terminal of the second inductor L2 is connected to the high potential side terminal of the load R1. The second capacitor C2 is connected between a node located between the second inductor L2 and the load R1 and the ground potential.

The sixth switch S6 and the seventh switch S7 can be formed by transistors such as MOSFETs or the like. A gate terminal of a transistor that constitutes the sixth switch S6 is connected to the input-side terminal of the seventh switch S7, and a gate terminal of a transistor that constitutes the seventh switch S7 is connected to the input-side terminal of the sixth switch S6. Therefore, the sixth switch S6 and the seventh switch S7 act as self-driven type synchronous rectification elements that are driven by a voltage generated in the secondary winding of the transformer T1.

An output voltage of the secondary winding of the transformer T1 that is rectified by the sixth switch S6 and the seventh switch S7 is smoothed by the second inductor L2 and the second capacitor C2 and then supplied to the load R1. As described above, a voltage of DC 12 V is supplied in the subject specification. An electric current of DC 200 A flows when the load R1 is being driven, and a power of 2400 W is consumed.

The drive unit 50 drives the switching elements by monitoring an output voltage supplied to the load R1 from the first DC-DC converter 40 and adaptively changing the respective duty ratios of switching elements (i.e., the second switch S2, the third switch S3, the fourth switch S4, and the fifth switch S5) to stabilize the output voltage. More specifically, when there is a decrease in the output voltage supplied to the load R1, the drive unit 50 controls, by increasing the duty ratios, the amount of an electric current flowing to the transformer T1 such that the amount of the electric current is increased. On the contrary, when there is an increase in the output voltage supplied to the load R1, the drive unit 50 controls, by lowering the duty ratios, the amount of an electric current flowing to the transformer T1 such that the amount of the electric current is decreased.

Upon receiving the output of the PFC circuit 30, the second DC-DC converter 60 generates a control voltage. This control voltage is mainly used to drive the first DC-DC converter 40 serving as a main power supply. For example, the control voltage is used for a power-supply voltage of the drive unit 50 and the control unit 80, a bias voltage of the transistors, a transmission signal to an external device other than the load R1, and the like. As described, the second DC-DC converter 60 functions as an auxiliary power supply that supports driving of the first DC-DC converter 40 serving as a main power supply. In the subject specification, the second DC-DC converter 60 generates auxiliary power supply output of DC 5V/10 A. This output may be further DC-DC converted according to the purpose of use.

An input terminal of the second DC-DC converter 60 is connected to an output terminal of the PFC circuit 30. An insulation-type converter of a flyback method can be employed for the second DC-DC converter 60. A detailed circuit configuration of an insulation-type converter of a flyback method is well known and is thus omitted.

The control unit 80 controls the operation and stopping of the PFC circuit 30, the first DC-DC converter 40, and the second DC-DC converter 60. The control unit 80 is formed by at least one of a microprocessor and a logic circuit. The control unit 80 controls the operation and stopping of the PFC circuit 30, the first DC-DC converter 40, and the second DC-DC converter 60 in accordance with an instruction from various programs such as a startup program or from an external device.

In the subject specification, the control unit 80 also operates the PFC circuit 30 when the first DC-DC converter 40 is being operated and stops the PFC circuit 30 when the first DC-DC converter 40 is being stopped. This is for the purpose of reducing the power consumption due to the driving of the PFC circuit 30. When the operation of the first DC-DC converter 40 and the operation of the PFC circuit 30 are associated with each other, the input voltage range of the first DC-DC converter 40 can be designed to be narrow, and the efficiency of the first DC-DC converter 40 can be increased. It is assumed in the following that a DC-DC converter having a conversion efficiency of 95% when an input voltage is DC 380 V is used for the first DC-DC converter 40.

When the first DC-DC converter 40 is being stopped, the PFC circuit 30 is also stopped. Thus, there is a possibility that a voltage in a relatively wide range is input to the second DC-DC converter 60 in the case of operating the second DC-DC converter 60 when the first DC-DC converter 40 is being stopped. Therefore, it is necessary to design the input voltage range of the second DC-DC converter 60 to be relatively wide, and the conversion efficiency of the second DC-DC converter 60 becomes lower than the conversion efficiency of the first DC-DC converter 40. It is assumed in the following that a DC-DC converter having a conversion efficiency of 70% when an input voltage is DC 380 V is used for the second DC-DC converter 60.

In order for the second DC-DC converter 60 to output a power of 50 W, a power of 72 W needs to be input to the second DC-DC converter 60. An electric current 13 flowing to the second DC-DC converter 60 from the PFC circuit 30 is DC 0.72 A when an output voltage of the PFC circuit 30 is DC 100 V and is approximately DC 0.19 A when an output voltage of the PFC circuit 30 is DC 380 V.

Figure 2:
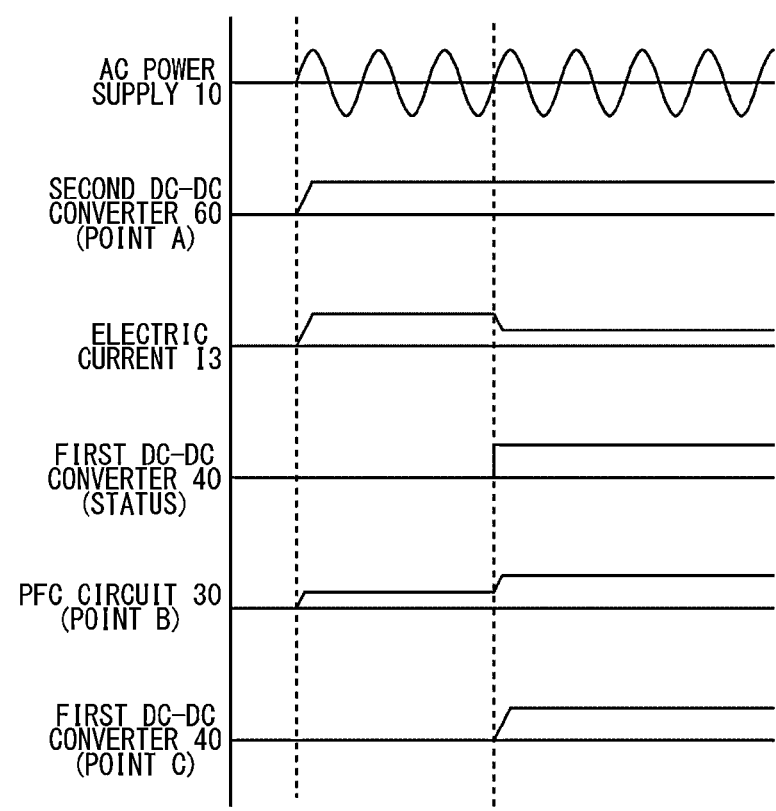
FIG. 2 is a diagram for explaining operation timing at the start of the power supply device according to the comparative example.

FIG. 2 is a diagram for explaining operation timing at the start of the power supply device 100 according to the comparative example. In FIG. 2, it is assumed that a commercial power supply to be input to the power supply device 100 is 100 V and 50 Hz. When an AC power supply 10 is supplied to the power supply device 100, an electric current 13 flows to the second DC-DC converter 60 via the rectification circuit 20 and the PFC circuit 30, which is being stopped, and the second DC-DC converter 60 becomes activated. The control unit 80 then activates the PFC circuit 30 and the first DC-DC converter 40. When the PFC circuit 30 is activated, the output voltage of the PFC circuit 30 is increased, and the electric current 13 flowing to the second DC-DC converter 60 from the PFC circuit 30 is decreased. Points A, B, and C in FIG. 2 correspond to respective voltages at nodes A, B, and C in FIG. 1, respectively.

Figure 3:
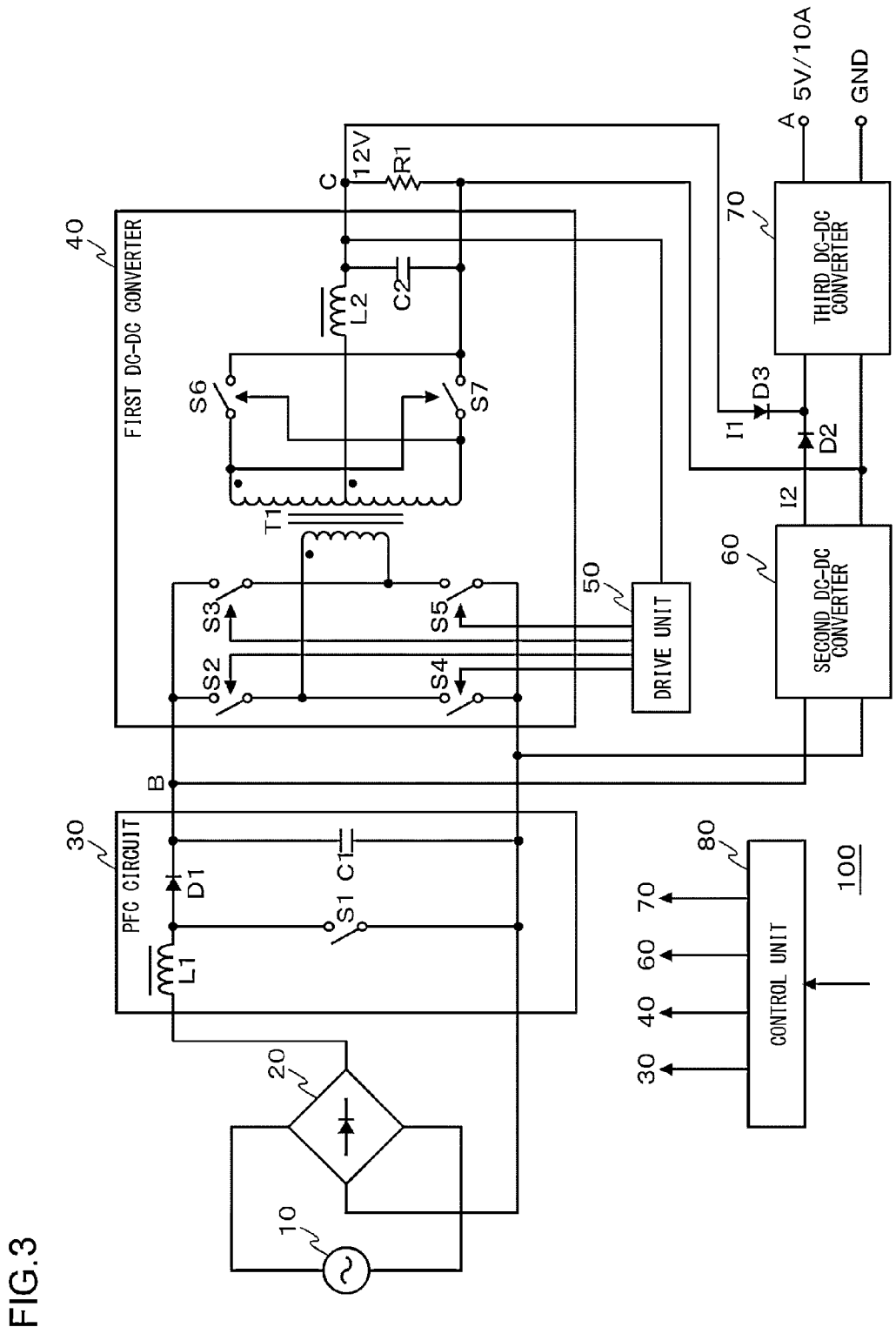
FIG. 3 is a diagram illustrating the configuration of a power supply device according to a first embodiment of the present invention.

FIG. 3 is a diagram illustrating the configuration of a power supply device 100 according to a first embodiment of the present invention. An explanation is given in the following regarding differences between the power supply device 100 according to the first embodiment and the power supply device 100 according to the comparative example. The power supply device 100 according to the first embodiment has a configuration where a third DC-DC converter 70, a second diode D2, and a third diode D3 are added to the configuration of the power supply device 100 according to the comparative example.

The third DC-DC converter 70 is connected in a stage following the second DC-DC converter 60. In other words, the second DC-DC converter 60 and the third DC-DC converter 70 are cascade-connected. An input terminal of the third DC-DC converter 70 is connected to the output terminal of the first DC-DC converter 40 as well as to the output terminal of the second DC-DC converter 60.

Rectification elements are inserted each between the input terminal of the third DC-DC converter 70 and the output terminal of the second DC-DC converter 60 and between the input terminal of the third DC-DC converter 70 and the output terminal of the first DC-DC converter 40. In the first embodiment, the second diode D2 and the third diode D3 are each inserted as the rectification elements. An anode terminal of the second diode D2 is connected to a high potential side output terminal of the second DC-DC converter 60, and a cathode terminal thereof is connected to a high potential side input terminal of the third DC-DC converter 70. An anode terminal of the third diode D3 is connected to a high potential side output terminal of the first DC-DC converter 40, and a cathode terminal thereof is connected to a high potential side input terminal of the third DC-DC converter 70.

An insulation-type converter of a forward type or a flyback type can be employed for the third DC-DC converter 70. Respective detailed circuit configurations thereof are well known and are thus omitted. Employment of an insulation-type converter allows for a design where a low potential side reference voltage of the third DC-DC converter 70 is different from a low potential side reference voltage of the first DC-DC converter 40 or the second DC-DC converter 60.

Upon receiving output of the PFC circuit 30, a cascade circuit of the second DC-DC converter 60 and the third DC-DC converter 70 generates a control voltage. In the first embodiment, the control unit 80 controls the operation and stopping of the third DC-DC converter 70 as well as the PFC circuit 30, the first DC-DC converter 40, and the second DC-DC converter 60. The control unit 80 operates the second DC-DC converter 60 and the third DC-DC converter 70 in the case of generating a control voltage when the PFC circuit 30 and the first DC-DC converter 40 are being stopped.

The control unit 80 operates the third DC-DC converter 70 and stops the second DC-DC converter 60 in the case of generating a control voltage when the PFC circuit 30 and the first DC-DC converter 40 are being operated. If an output voltage of the first DC-DC converter 40 is set to be higher than an output voltage of the second DC-DC converter 60, the output voltage of the first DC-DC converter 40 becomes effective. Thus, it is not always necessary to stop the second DC-DC converter 60. However, since a little power is consumed even when the second DC-DC converter 60 is in an unloaded state, the power consumption can be reduced more when the second DC-DC converter 60 is stopped. In the subject specification, the output voltage of the first DC-DC converter 40 is set to be DC 12 V as described above. In the first embodiment, the output voltage of the second DC-DC converter 60 is set to be DC 10 V.

As described, the output of the second DC-DC converter 60 becomes effective when the PFC circuit 30 and the first DC-DC converter 40 are being stopped, and the output of the first DC-DC converter 40 becomes effective when the PFC circuit 30 and the first DC-DC converter 40 are being operated. If the output voltage of the first DC-DC converter 40 is set to be higher than the output voltage of the second DC-DC converter 60, the conversion efficiency is higher when a voltage is applied to the third DC-DC converter 70 from the first DC-DC converter 40 compared to when a voltage is applied from the second DC-DC converter 60. When the PFC circuit 30 and the first DC-DC converter 40 are being operated, a voltage can be applied from the first DC-DC converter 40.

When the first DC-DC converter 40 is being stopped, a control voltage is generated by two stages, the second DC-DC converter 60 and the third DC-DC converter 70. Thus, the conversion efficiency becomes decreased compared to when the control voltage is generated solely by the second DC-DC converter 60 shown in the comparative example. In order to minimize this decrease, it is necessary to use the third DC-DC converter 70 having a high conversion efficiency. It is assumed in the following that a DC-DC converter having a conversion efficiency of 95% when an input voltage is DC 12 V is used for the third DC-DC converter 70.

In order for the third DC-DC converter 70 to output a power of 50 W when the PFC circuit 30 and the first DC-DC converter 40 are being operated, a power of approximately 52.6 W needs to be input to the third DC-DC converter 70. The output voltage of the first DC-DC converter 40 is DC 12 V. Thus, an electric current I1 flowing from the first DC-DC converter 40 to the third DC-DC converter 70 is approximately DC 4.38 A. Note that a voltage drop in the third diode D3 is not being taken into consideration. The conversion efficiency of the first DC-DC converter 40 is 95%. Thus, in order for the first DC-DC converter 40 to supply approximately 52.6 W to the third DC-DC converter 70, the first DC-DC converter 40 needs to receive a power supply of approximately 55.4 W from the PFC circuit 30.

As described, in the power supply device 100 according to the first embodiment, a power of approximately 55.4 W is necessary for generating auxiliary power supply output of DC 5V/10 A when the PFC circuit 30 and the first DC-DC converter 40 are being operated. On the other hand, in the power supply device 100 according to the comparative example, a power of 72 W is necessary for generating auxiliary power supply output of DC 5V/10 A when the PFC circuit 30 and the first DC-DC converter 40 are being operated. Therefore, the use of the power supply device 100 according to the first embodiment allows for a reduction by the amount of the difference, which is approximately 16.6 W. As the conversion efficiency of the first DC-DC converter 40 becomes higher than the conversion efficiency of the second DC-DC converter 60 and the difference thereof becomes larger, a reduction width thereof becomes larger.

Figure 4:
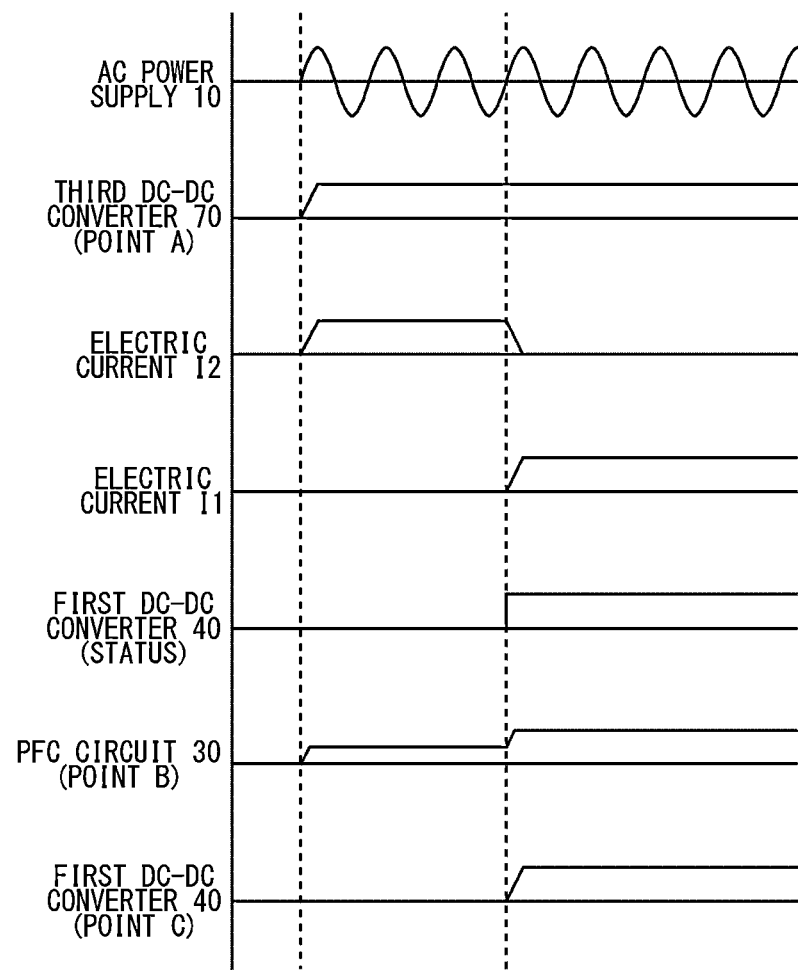
FIG. 4 is a diagram for explaining operation timing at the start of the power supply device according to the first embodiment of the present invention.

FIG. 4 is a diagram for explaining operation timing at the start of the power supply device 100 according to the first embodiment of the present invention. When an AC power supply 10 is supplied to the power supply device 100, an electric current I2 flows to the third DC-DC converter 70 via the rectification circuit 20, the PFC circuit 30 being stopped, the second DC-DC converter 60, and the second diode D2, and the third DC-DC converter 70 becomes activated. The control unit 80 then activates the PFC circuit 30 and the first DC-DC converter 40. When the PFC circuit 30 is activated, the output voltage of the PFC circuit 30 is increased. When the first DC-DC converter 40 is activated, the electric current I1 flows to the third DC-DC converter 70 from the first DC-DC converter 40, and the electric current I2 from the second DC-DC converter 60 to the third DC-DC converter 70 stops.

As explained above, according to the first embodiment, the efficiency of the power supply device 100 can be increased while preventing an increase in power consumption by cascade-connecting the second DC-DC converter 60 and the third DC-DC converter 70 and achieving a configuration where the output voltage of the first DC-DC converter 40 is applicable to the input of the third DC-DC converter 70. In other words, an increase in the power consumption is prevented by stopping the PFC circuit 30 when the first DC-DC converter 40 is being stopped. In that case, auxiliary power supply output can still be generated by the second DC-DC converter 60 and the third DC-DC converter 70. On the other hand, the efficiency can be increased by generating auxiliary power supply output by the second DC-DC converter 60 and the third DC-DC converter 70 when the first DC-DC converter 40 is being operated. The details of the principle thereof are already described.

Figure 5:
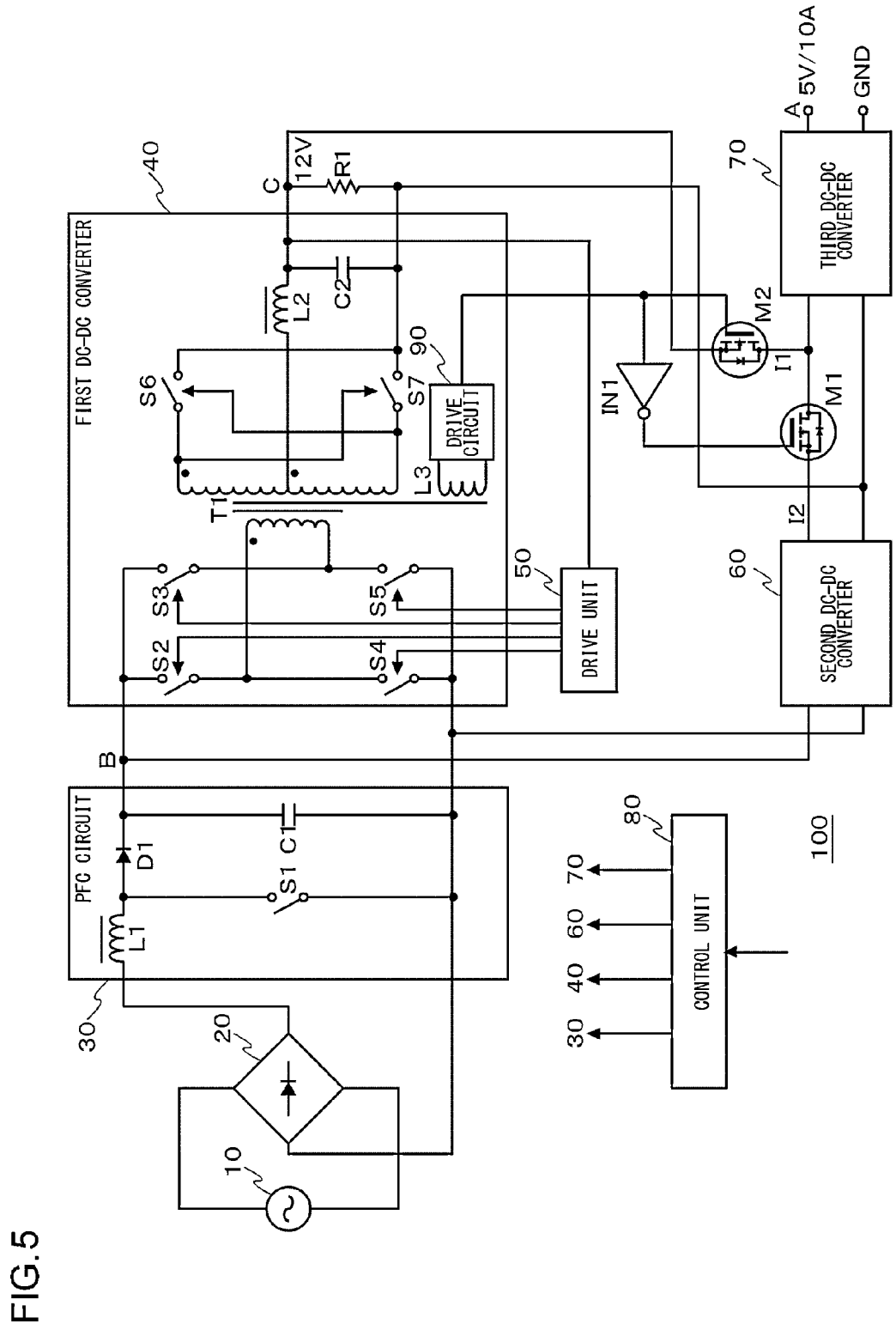
FIG. 5 is a diagram illustrating the configuration of a power supply device according to a second embodiment of the present invention.

FIG. 5 is a diagram illustrating the configuration of a power supply device 100 according to a second embodiment of the present invention. An explanation is given in the following regarding differences between the power supply device 100 according to the second embodiment and the power supply device 100 according to the first embodiment. In the second embodiment, a second MOSFET (M2) instead of the third diode D3 is used as a rectification element to be inserted between the input terminal of the third DC-DC converter 70 and the output terminal of the first DC-DC converter 40. A first MOSFET (M1) instead of the second diode D2 is used as a rectification element to be inserted between the input terminal of the third DC-DC converter 70 and the output terminal of the second DC-DC converter 60. A third inductor L3, a drive circuit 90, and an inverter IN1 used for controlling on and off of the first MOSFET (M1) and the second MOSFET (M2) are added.

The third inductor L3 is installed on the secondary side of the transformer T1. An electric current flows to the third inductor L3 when the first DC-DC converter 40 is being operated, and an electric current does not flow to the third inductor L3 when the first DC-DC converter 40 is being stopped. The drive circuit 90 outputs a high-level signal when an electric current is flowing to the third inductor L3 and outputs low-level signal when an electric current is not flowing to the third inductor L3. An output signal of the drive circuit 90 is input to a gate terminal of the second MOSFET (M2) and an input terminal of the inverter IN1. The inverter IN1 inverts the level of the output signal of the drive circuit 90 and supplies the output signal to a gate terminal of the first MOSFET (M1).

The first MOSFET (M1) and the second MOSFET (M2) are N-channel MOSFETs. A parasitic diode is formed from a source to a drain in a MOSFET. Therefore, in a state where the first MOSFET (M1) and the second MOSFET (M2) are turned off, the configuration of the power supply device 100 is the same as the circuit configuration of the power supply device 100 according to the first embodiment shown in FIG. 3.

When the first DC-DC converter 40 is being operated, the second MOSFET (M2) is turned on, and the first MOSFET (M1) is turned off. When the first DC-DC converter 40 is being stopped, the second MOSFET (M2) is turned off, and the first MOSFET (M1) is turned on. When the MOSFETs are turned on, an electric current flows via a channel instead of the parasitic diode. If an electric current flows via the channel, there is no longer any effect of voltage drops by the parasitic diode.

According to the second embodiment as described above, the following advantageous effects can be achieved in addition to the advantageous effects achieved in the first embodiment. More specifically, power loses are reduced by the amount of voltage drops caused by the second diode D2 and the third diode D3. The second diode D2 shown in FIG. 3 may be used instead of the first MOSFET (M1) so as to omit the inverter IN1. The efficiency is lower in the generation of auxiliary power supply output by the second DC-DC converter 60 and the third DC-DC converter 70 compared to the generation of auxiliary power supply output by the first DC-DC converter 40 and the third DC-DC converter 70. Thus, contribution of the second diode D2 to voltage drops is small. Therefore, a design is possible where measures against voltage drops by the second diode D2 are not taken, giving priority to cost.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

An example has been given where a full-bridge method is employed for the first DC-DC converter 40. Alternatively, a half-bridge method, a push-pull method, a forward method, or the like may be employed.

What is claimed is:

1. A power supply device comprising:
   a PFC (Power Factor Correction) circuit configured to improve the power factor of rectified power;
   a first DC-DC converter configured to generate a voltage to be supplied to a load upon receiving output of the PFC circuit; and
   a second DC-DC converter and a third DC-DC converter configured to generate a control voltage upon receiving the output of the PFC circuit,
   wherein the second DC-DC converter and the third DC-DC converter are cascade-connected, and
   wherein an input terminal of the third DC-DC converter is connected to both an output terminal of the second DC-DC converter and an output terminal of the first DC-DC converter.

2. The power supply device according to claim 1, further comprising:
   a control unit configured to control the operation and stopping of the PFC circuit, the first DC-DC converter, the second DC-DC converter, and the third DC-DC converter,
   wherein the control unit operates the second DC-DC converter and the third DC-DC converter in the case of generating the control voltage when the PFC circuit and the first DC-DC converter are being stopped.

3. The power supply device according to claim 2,
   wherein the control unit operates the third DC-DC converter and stops the second DC-DC converter in the case of generating the control voltage when the PFC circuit and the first DC-DC converter are being operated.

4. The power supply device according to claim 1,
   wherein rectification elements are inserted each between the input terminal of the third DC-DC converter and the output terminal of the second DC-DC converter and between the input terminal of the third DC-DC converter and the output terminal of the first DC-DC converter.

5. The power supply device according to claim 4,
   wherein the rectification element inserted between the input terminal of the third DC-DC converter and the output terminal of the first DC-DC converter is a MOSFET (Metal Oxide Semiconductor Field Effect Transistor), and
   wherein the MOSFET is turned on when the first DC-DC converter is being operated and is turned off when the first DC-DC converter is being stopped.

6. The power supply device according to claim 1,
   wherein an output voltage of the first DC-DC converter is set to be higher than an output voltage of the second DC-DC converter.

7. The power supply device according to claim 1,
   wherein a DC-DC converter having a conversion efficiency that is higher than the conversion efficiency of the second DC-DC converter is used for the first DC-DC converter.

* * * * *